United States Patent
Lorenz et al.

(10) Patent No.: US 10,174,147 B2
(45) Date of Patent: Jan. 8, 2019

(54) CURABLE COMPOSITION AND CURED PRODUCT HAVING ANTI-MICROBIAL PROPERTIES

(71) Applicant: Fachhochschule Münster, Steinfurt (DE)

(72) Inventors: Reinhard Lorenz, Steinfurt (DE); Björn Fischer, Saerbeck (DE); Bettina Henglmüller, Lingen (DE); Marvin Henglmüller, Lingen (DE); Florian Manser, Steinfurt (DE)

(73) Assignee: FH MÜNSTER, Münster (DE)

( * ) Notice: Subject to any disclaimer, the term of this patent is extended or adjusted under 35 U.S.C. 154(b) by 0 days.

(21) Appl. No.: 15/500,487

(22) PCT Filed: Jul. 27, 2015

(86) PCT No.: PCT/EP2015/067099
§ 371 (c)(1),
(2) Date: Jan. 30, 2017

(87) PCT Pub. No.: WO2016/016158
PCT Pub. Date: Feb. 4, 2016

(65) Prior Publication Data
US 2017/0210839 A1     Jul. 27, 2017

(30) Foreign Application Priority Data
Jul. 31, 2014   (EP) .................... 14179357

(51) Int. Cl.
| | | |
|---|---|---|
| *C08F 283/01* | (2006.01) | |
| *C08F 220/34* | (2006.01) | |
| *C08F 265/06* | (2006.01) | |
| *C09D 133/24* | (2006.01) | |
| *C08F 283/00* | (2006.01) | |
| *C09D 151/08* | (2006.01) | |
| *C08F 263/02* | (2006.01) | |
| *C08F 271/00* | (2006.01) | |
| *C08G 18/67* | (2006.01) | |
| *C08G 18/32* | (2006.01) | |
| *C08F 220/18* | (2006.01) | |

(52) U.S. Cl.
CPC .......... *C08F 265/06* (2013.01); *C08F 263/02* (2013.01); *C08F 271/00* (2013.01); *C08F 283/008* (2013.01); *C08F 283/01* (2013.01); *C08G 18/3206* (2013.01); *C08G 18/672* (2013.01); *C09D 133/24* (2013.01); *C09D 151/08* (2013.01); *C08F 220/34* (2013.01); *C08F 2220/1825* (2013.01); *C08L 2312/00* (2013.01)

(58) Field of Classification Search
CPC ............................. C08F 283/01; C08F 220/34
See application file for complete search history.

(56) References Cited

U.S. PATENT DOCUMENTS

| | | | | |
|---|---|---|---|---|
| 4,717,739 A | * | 1/1988 | Chevreux | ......... B32B 17/10706 156/99 |
| 5,281,634 A | | 1/1994 | Heese et al. | |
| 2010/0056722 A1 | * | 3/2010 | Thomas | ............... C08G 18/672 525/123 |

FOREIGN PATENT DOCUMENTS

| | | |
|---|---|---|
| CN | 103694429 A | 4/2014 |
| EP | 0 518 122 A1 | 12/1996 |
| JP | 2002-256030 A | 9/2002 |
| WO | WO 2001/085813 A2 | 11/2001 |

OTHER PUBLICATIONS

Furuse et al., Dental Materials 2011, 27, 497-506.*
ROHM GMBH "Standard Monomers," Product Catalog, 11 pgs.
Menzel (2011) "Schutzschicht gegen Bakterien [Protective layer against bacteria]," Nachrichten aus der Chemie. 59(11):1039-43.— provided with English machine translation.
Frankfurt am Main (2005) Sections 4.1.1.-4.1.5. In; Faserverstärkte Kunststoffe und duroplastische Formmassen [Fiber reinforced plastics and thermoset moldings]. p. 39-43.—provided with English machine translation of Sections 4.1.1.-4.1.5.
International Search Report with Written Opinion corresponding to International Patent Application No. PCT/EP2015/067099, dated Oct. 28, 2015.

* cited by examiner

*Primary Examiner* — Vu A Nguyen
(74) *Attorney, Agent, or Firm* — Leydig, Voit & Mayer, Ltd.

(57) ABSTRACT

The present invention relates to curable compositions which can preferably be used for making products with an intrinsically antimicrobial effect. In addition, the present invention relates to the use of this curable composition in various processing methods.

15 Claims, No Drawings

CURABLE COMPOSITION AND CURED PRODUCT HAVING ANTI-MICROBIAL PROPERTIES

CROSS-REFERENCE TO RELATED APPLICATIONS

This application is a U.S. National Stage Application filed under 35 U.S.C. § 371 of International Application No. PCT/EP2015/067099, filed Jul. 27, 2015, which claims the benefit of European Application No. 14179357.0, filed Jul. 31, 2014. All of these applications are hereby incorporated by reference in their entireties.

The present invention relates to curable compositions which can preferably be used for making products with an intrinsically antimicrobial effect. In addition, the present invention relates to the use of this curable composition in various processing methods.

In numerous applications of materials such as plastics, the growth of algae, fungi or molluscs is an unpleasant side-effect. Considerably more serious problems can, however, arise because of the formation of bacterial biofilms and the transmission of pathogenic germs. Combatting and avoiding these unwanted effects is thus of great practical importance in medicine, hygiene and food technology. In order to counter these problems, apart from cleaning the plastic mechanically/chemically, it is common to include additives, these frequently being classic biocides (e.g. silver, copper or zinc compounds or organic compounds such as triclosan, 10,10'-oxy-bis-phenoxyarsine, N-(trifluoromethylthio)phthalimide, N-(trichloromethylthio)phthalimide, various isothiazoliones).

It has so far been difficult to give surfaces antimicrobial properties without the antimicrobial agent used as an additive diffusing out of the surface. There have been some attempts to use antimicrobially functionalised monomers to construct antimicrobial polymers. These, however, were frequently characterised by inadequate material properties, such as too low a glass transition temperature.

In "Schutzschicht gegen Bacterien" ("Protective layer against bacteria", Nachrichten aus der Chemie [Chemistry News], 59, November 2011, pp. 1039-43), H. Menzel provides a survey of antimicrobial coatings suitable for use in the medical field, based on polymers with hydrophobic structural elements in combination with a high positive charge density. The different mechanisms of action against gram-positive and gram-negative bacteria are discussed briefly. Most of the structures are based on quaternary ammonium and phosphonium ions. Antimicrobial polymers for compact material applications are not discussed.

There is consequently a need in the state of the art for products which on the one hand have good material properties and on the other hand good antimicrobial properties.

One problem of the present invention therefore consists in providing a technology that is easy to use in practice, with which products given antimicrobial properties can be manufactured, and from which no antimicrobial additives can diffuse out, i.e. the products should be intrinsically antimicrobial. A further problem consists in providing an antimicrobial product which is antimicrobially functionalised "in bulk", i.e. in the total volume, and therefore, after its surface has been damaged or changed, e.g. by machining, an impact, abrasion, and polishing or cutting, forms a new surface which is likewise intrinsically antimicrobial.

In addition, the antimicrobial product should also have good material properties, such as a sufficiently high glass transition temperature and solvent resistance.

The problem underlying the invention is solved by the present, curable composition, which contains a specific methacrylate or acrylate in addition to a specific compound with a radically reactive double bond The subject matter of the invention is therefore a curable composition containing
(a) a compound with a radically reactive double bond selected from an unsaturated polyester, a vinyl ester and vinyl ester urethane, or mixtures thereof and
(b) a methacrylate and/or acrylate selected from tert.-butyl aminoethyl methacrylate, dimethyl aminoethyl methacrylate, diethyl aminoethyl methacrylate, tert.-butyl aminoethyl acrylate, dimethyl aminoethyl acrylate, diethyl aminoethyl acrylate and mixtures thereof.

The cured product formed after the curable composition of the invention has cured usually acts intrinsically antimicrobially without the use of additional biocides. The novel products are therefore described as intrinsically antimicrobial. The advantage of the curable composition of the invention is that products can be manufactured from it from which antimicrobial agents cannot escape and that those products remain antimicrobial even when their surface is subjected to mechanical alteration, machining or damage.

A further subject of the invention is a use of the composition of the invention in a processing method, such as coating, painting, casting, dip coating, laminating, gap impregnation, centrifugation, bonding, resin injection, pressing, injection moulding, pultrusion, filling and levelling, and winding.

Another subject of the invention is a method for producing cured antimicrobial products, wherein the curable composition of the invention is cured.

Yet another subject of the invention is a product with an antimicrobial effect, obtainable by curing the curable composition of the invention.

As component (a), the curable composition of the invention contains a compound with a radically reactive double bond selected from an unsaturated polyester, vinyl ester and/or vinyl ester urethane, or mixtures thereof.

In a preferred embodiment, the compound with a radically reactive double bond (a) is an unsaturated polyester. The unsaturated polyester can preferably be compounds which are solid or semi- at solid 23° C. In addition to ester groups, the unsaturated polyesters include at least one radically reactive unsaturated carbon-carbon bond, i.e. there is at least one carbon-carbon-double bond.

In a preferred embodiment, the unsaturated polyester is obtainable by reacting a dicarboxylic acid or a derivative of the dicarboxylic acid and a diol, the dicarboxylic acid being a compound of formula (I)

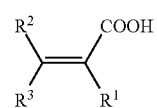

Formula (I)

where
$R^1$ is selected independently from H, $CH_3$ and $CH_2COOH$, and
$R^2$ and $R^3$ are selected independently from H, $CH_3$ and COOH.

The derivatives of the dicarboxylic acid can preferably be esters of the dicarboxylic acid, where either one or both carboxylic acid functions may be present in esterified form. In the event that both carboxylic acid functions are present in esterified form, the esters may be identical or different, though they are preferably identical. Examples of suitable esters are methyl ester, ethyl ester, propyl ester and butyl ester, preferably methyl or ethyl ester, more preferably methyl ester.

A preferably alternative is that the dicarboxylic acid derivative may be the acid anhydride, which formally arises when water is cleaved off from the dicarboxylic acid.

Another preferable alternative is that the carboxylic acid derivative may be the acid chloride.

The dicarboxylic acid or the dicarboxylic acid derivative may preferably be fumaric acid, mesaconic acid, maleic acid or maleic acid anhydride, citraconic acid or citraconic acid anhydride, itaconic acid or itaconic acid anhydride or mixtures thereof. In addition, maleic acid may be monofunctionally reacted with dicyclopentadiene to the dicyclopentadienyl maleic acid semi-ester, which can be incorporated into unsaturated polyesters. Itaconic acid and its anhydride are particularly preferable, especially itaconic acid.

Itaconic acid is the compound of formula (II)

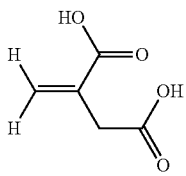

Formula (II)

The above dicarboxylic acids are also referred to as dicarboxylic acids with radically reactive double bonds. The unsaturated polyesters obtainable therefrom have reactive double bonds which are suitable for radical curing (crosslinking) with component (b) described below.

In a further preferred embodiment, dicarboxylic acids which are not radically reactive, or their anhydrides and chlorides, may likewise participate in the reaction with the diol and be incorporated into the unsaturated polyester, such as aromatic dicarboxylic acids (for example phthalic acid, isophthal acid and terephthalic acid), aliphatic dicarboxylic acids (for example succinic acid, adipic acid and sebacic acid) and cycloaliphatic dicarboxylic acids (for example 1,2-cyclohexane dicarboxylic acid, 1,4-cyclohexane dicarboxylic acid and 1,2,5,6-tetrahydrophthalic acid).

In addition to the dicarboxylic acid, a tricarboxylic acid and/or a tricarboxylic acid anhydride or a tetracarboxylic acid and/or a tetracarboxylic acid anhydride, e.g. trimellitic acid, trimellitic acid anhydride, pyromellitic acid or pyromellitic acid dianhydride, can be used to produce the unsaturated polyester.

The diol is preferably selected from the group of 1,2-ethylene glycol, 1,2-propanediol, 1,3-propanediol, diethylene glycol, dipropylene glycol, triethylene glycol, tripropylene glycol, neopentyl glycol, butane-1,3-diol, butane-1,2-diol, butane-2,3-diol, butane-1,4-diol, 2-butyl-2-ethyl propanediol-1,3, 2-methyl propane-1,3diol, 2,2,4-trimethyl pentanediol-1,3, 2-ethyl-2-methyl propane-1,3-diol, 2,2-diethyl propanediol-1,3, 2-propyl-2-methyl propanediol-1,3, pentane-1,5-diol, hexane-1,6-diol, 2,4-dimethyl-2-ethyl hexane-1,3-diol, hydroxypivalic acid neopentyl glycol ester, isosorbide, cycloaliphatic diols, such as tricyclodecane dimethanol, perhydrogenated bisphenol A, 2,2,4,4-tetramethyl cyclobutanediol-1,3, 1,4-cyclohexane dimethanol, ethoxylated and propoxylated bisphenol A or mixtures thereof. Neopentyl glycol, hydroxypivalic acid neopentyl glycol ester, 1,4-cyclohexane dimethanol, tricyclodecane dimethanol and ethoxylated bisphenol A are preferred.

In a preferred embodiment, the diol may contain up to 10 mol % triol The triol is preferably selected from glycerol, trimethylol propane, triethanolamine, triisopropanolamine or mixtures thereof. Instead of the triol, it is also possible to use a different trifunctional compound, e.g. dimethylol butanoic acid or dimethylol propionic acid.

In a preferred embodiment, the unsaturated polyester is obtainable by reacting a mixture containing
47 to 53 mol % unsaturated radically reactive dicarboxylic acid or anhydride thereof, particularly preferably about 50 mol % unsaturated radically reactive dicarboxylic acid or anhydride thereof
47 to 53 mol % diol, particularly preferably about 50 mol % diol
based on the total molar amount in the unsaturated polyester.

In an alternative preferred embodiment, the unsaturated polyester is obtainable by reacting a mixture containing
20 to 60 mol %, preferably 30 to 55 mol % unsaturated radically reactive dicarboxylic acid or anhydride thereof
0 to 30 mol %, alternatively 1 to 20 mol %, non-radically-reactive dicarboxylic acid or anhydride thereof
0 to 10 mol %, alternatively 0.1 to 5 mol %, tricarboxylic and/or tetracarboxylic acid or anhydride thereof
40 to 60 mol %, preferably 30 to 55 mol %, diol
0 to 10 mol %, alternatively 0.1 to 5 mol %, triol,
based on the total molar amount in the unsaturated polyester.

The unsaturated polyester is produced by, for example, polycondensation, preferably in the melt, from dicarboxylic acid or a derivative of the dicarboxylic acid which are at least partially functionalised with a radically reactive double bond, and diol. The polycondensation can preferably be carried out in the presence of an esterification catalyst, such as butyl tin acid. It is likewise preferably possible to add a polymerisation inhibitor, such as hydroquinone or hydroquinone monomethyl ether. The polycondensation is preferably carried out at temperatures of 100° C. to 250° C. more preferably 120° C. to 230° C., especially 130 to 200° C. The reaction time for the polycondensation is 3 to 60 hours, preferably 4 to 40 hours, more preferably 4 to 24 hours. Towards the end of the condensation, a vacuum may preferably be applied.

As a preferred alternative, the unsaturated polyester can be prepared by esterification in the presence of an entrainer and preferably an esterification catalyst. Suitable entrainers are solvents which preferably have a boiling point of 40-150° C. and, in the liquid phase, are not miscible with water. By way of example, one might mention the solvents methylene chloride, chloroform, toluene and the xylenes. After the polyester has been prepared, they are preferably stripped by distillation followed by vacuum treatment.

As a preferable alternative, the unsaturated polyester can be prepared by transesterification. For this purpose, the dicarboxylic acids required are used as dimethyl ester or diethyl ester, and any optionally required tricarboxylic acids as trimethyl ester or triethyl ester. In the presence of a transesterification catalyst, the polyester is prepared by stripping methanol or ethanol. Towards the end of the reaction, vacuum treatment is preferably carried out. Suitable transesterification catalysts are, for example, zinc (II) acetate, calcium acetate, manganese (II) acetate, finely dispersed antimony (III) oxide, finely dispersed titanium dioxides and finely dispersed germanium dioxide.

As a preferable alternative, the unsaturated polyester can be prepared in the form of a Schotten-Baumann reaction. For this purpose, the dicarboxylic acids required are converted into the dicarboxylic acid dichlorides and, where applicable, the tricarboxylic acids into the tricarboxylic acid trichlorides. Suitable reagents for this purpose are, for example, thionyl chloride, phosphorus trichloride, phosphorus oxytrichloride and phosphorus pentachloride. The acid chlorides prepared in this way are reacted with the diol at −30° C. to +30° C. in the presence of a base and a solvent. As examples, one may think of such bases as milk of lime, sodium hydroxide, potassium hydroxide, triethylamine and pyridine. Sodium hydroxide and potassium hydroxide are preferably used as an aqueous solution. Solvents for acid chloride, diol and polyester are, for example, chlorobenzene, methylene chloride and chloroform. The reaction is preferably carried out for 2 to 20 hours, preferably accompanied by intensive stirring. After that, any solids present are filtered off and the aqueous phase stripped. The organic phase is preferably washed with water. After that, the solvent is distilled off, it being preferable to work with vacuum support towards the end of distillation.

The degree of polycondensation can be determined, on the one hand, from the amount of water of condensation obtained relative to the amount of water of condensation calculated theoretically. A precise method of describing the degree of polycondensation is to determine the acid value. That indicates how many carboxyl groups are still present, or how much of the dicarboxylic acid used has been reacted away.

In a preferred embodiment, the unsaturated polyester (a) has an acid value of 4-70, more preferably 6 to 60, especially 10 to 50.

In order to determine the acid value, approx. 2 g of the respective unsaturated polyester are weighed in and dissolved in 40 ml acetone using a magnetic stirrer on a hotplate. After the solution has cooled to 23° C., 3-4 drops of the indicator phenol phthalein are added and titrated with 0.5 molar methanolic KOH to the point of change. On the basis of the volume of KOH solution consumed, the amount of polyester weighed in, the KOH concentration and the titre of the KOH solution, the acid value is calculated, with 1 mol of the KOH (molecular weight: 56.11 g) corresponding to 1 mol carboxyl groups.

$$\frac{0,5 * M(KOH) * Titer * V[ml]}{Einwaage(UP)} = S\ddot{a}urezahl \left[\frac{mg\ KOH}{g\ UP}\right]$$

$$\frac{0.5 * M(KOH) * titre * V[ml]}{amount\ weighed\ in\ (UP)} = acid\ value \left[\frac{mg\ KOH}{g\ UP}\right]$$

UP corresponds to the unsaturated polyester.

In a preferred embodiment, the melt viscosity of the unsaturated polyester is 10 to 5,000 mPas, preferably 20 to 4,000 mPas, especially 40 to 3,250 mPas.

The melt viscosity of the unsaturated polyester is determined with a cone and plate viscometer from Epprecht Instruments+Controls AG (standard cone C with a diameter of 19.5 mm and a cone angle 0.5°). For this purpose, the plate is preheated to 150° C. before carrying out the measurement. After that, the polyester is applied to the plate with a wooden spatula and the viscosity is measured at a particular shear rate at 150° C.

The scale of the cone and plate viscometer used is subdivided into 10 parts. One scale part corresponds to 100 mPas at the corresponding shear rate.

After the polycondensation of the dicarboxylic acid and/or the derivative of the dicarboxylic acid on the one hand and diol on the other hand, the unsaturated polyester may be present as a mixture of polymer, oligomer and residual monomer according to the respective molecular weight distribution.

In a preferred embodiment, the mass-average molecular weight ($M_w$) of the unsaturated polyester is 2,000 to 250,000 g/mol, preferably 3,000 to 150,000 g/mol, especially 3,500 to 80,000 g/mol.

The mass-average molecular weight ($M_w$) is determined by means of gel permeation chromatography. For this purpose, approx. 0.1 g of the polyester is weighed in and dissolved in 10 ml tetrahydrofuran. After that, 1.5 ml are filtered through a syringe filter holder and placed in the GPC (from Viscotek GPC max VE2001, 2 PSS SD LIN M 5 μm 8*300 mm columns in series, calibration with polystyrene standard (ReadyCal-Kit Poly(styrene), PSS-pskitr1 from PSS) and measured. Tetrahydrofuran is also used as the eluent (volume flow 1 ml per minute). The column temperature is 35° C. A refractive index detector is used as the detector.

The molar ratio between, on the one hand, dicarboxylic acid and/or derivative of dicarboxylic acid and, on the other hand, diol preferably lies within a range of 0.9:1 to 1:0.9, particularly preferably 1.03:1 to 0.97:1, in order to prepare unsaturated polyester with a sufficient molecular weight. In addition, side reactions leading to the formation of volatile by-products may have a major influence on the necessary stoichiometry. When butanediol-1,4 is used, for example, this is the formation of tetrahydrofuran; when 1,2-propylene glycol is used, it is the formation of 2-ethyl-4-methyl-1,3-dioxolan. The effect of both side reactions is that a considerable excess is required during condensation. In the case of 1,2-propylene glycol, this is preferably 7-15 mol %; in the case of 1,4-butanediol, it is preferably about 30 mol %.

In a preferred embodiment, the unsaturated polyester may also be aminofunctionalised. The amino groups may preferably be tertiary amino groups.

The antimicrobially active amino groups may preferably be introduced in the form of diethoxylated or dipropoxylated monoalkyl amines, which can be used in the unsaturated polyester as the diol component. Examples are the diols methyl diethanolamine, tert.-butyl diethanolamine, methyl diisopropanolamine, tert.-butyl diisopropanolamine or N-hydroxyethyl piperazine, bishydroxyethyl piperazine, N-hydroxypropyl piperazine, bishydroxypropyl piperazine or 3-(diethylamino)-1,2-propanediol.

After the unsaturated polyester (a) has been mixed with component (b) described below, the curable composition can be obtained, which is referred to as unsaturated polyester resin (UP resin). The curable composition can preferably be present in liquid form at 25° C. Radical curing usually results in a covalent compound of components (a) and (b). After curing of the UP resin, one usually speaks of a UP duromer or UP network.

In an alternative preferred embodiment, the compound with a radically reactive double bond (a) is a vinyl ester. Vinyl esters have at least one reactive double bond, i.e. there is at least one radically reactive carbon-carbon double bond.

The vinyl esters are preferably obtainable by reacting bisphenol A-based, bisphenol F-based and novolak-based glycidyl ethers with methacrylic acid, in the course of which the methacrylic acid ester forms. It is also possible to use glycidyl ethers of other bisphenols (e.g. bisphenol TMC). The glycidyl ether for the purposes of the invention can also be a mixture of different glycidyl ethers.

The vinyl ester in component a) is preferably a vinyl ester from, on the one hand, di-, tri- and/or higher-functional glycidyl ethers of a di-, tri- and/or higher-valent phenol and, on the other hand, methacrylic acid in the molar ratio 1.25:1 to 0.75:1.

After the vinyl ester (a) has been mixed with component (b) described below, the curable composition can be obtained, which can in this case be referred to as the VE resin. The resins based on bisphenol A can be referred to as VE/BA resins. The resins based on novolak can be referred to as VE/NO resins (AVK-TV-Handbuch, "Faserverstärkte Kunststoffe and duroplastische Formassen" (Fibre-reinforced plastics and duroplastic moulding compounds), 2nd edition 2005, page 40). The curable composition can preferably be present in liquid form at 25° C. Radical curing usually results in a covalent compound of components (a) and (b). After curing of the VE resin, one usually speaks of a VE duromer or VE network.

In an alternative preferred embodiment, the compound with a radically reactive double bond (a) is a vinyl ester urethane. The vinyl ester urethanes have at least one reactive double bond, i.e. there is at least one radically reactive carbon-carbon double bond present.

In a preferred embodiment, the vinyl ester urethane is obtainable by reacting a hydroxyalkyl acrylate and/or hydroxyalkyl methacrylate, such as hydroxypropyl methacrylate and/or hydroxyethyl methacrylate, with diisocyanates and/or triisocyanates and/or polyisocyanates. Alternatively, reaction products of diols and/or triols and/or tetrols of different chain lengths, hydroxypropyl methacrylate and/or hydroxyethyl methacrylate, and diisocyanates or triisocyanates are used. By selecting the diols, triols, tetrols and isocyanates appropriately, it is, for example, possible to influence the network properties and hence to adjust them to the requirements of the most varied applications.

Preferred diisocyanates are monomeric MDI, polymeric MDI (MDI: methylene diphenyl diisocyanate), 2,4-TDI, 2,6-TDI (TDI: toluylene diisocyanate), IPDI, oligomerisation products of IPDI (IPDI: isophorone diisocyanate), HDI, oligomerisation products of HDI (HDI: hexamethylene diisocyanate), the oligomerisation products of IPDI and HDI being, for example, the corresponding isocyanurates and biurets, which are commercially available in various viscosities and functionalities. In addition, further di- and triisocyanates which do not belong to the MDI, TDI, IPDI or HDI group, are suitable in accordance with the invention.

In a preferred embodiment, chain extenders can be used. These chain extenders can preferably be compounds which have at least two hydroxy groups. Examples of chain extenders are propylene glycol, dipropylene glycol, tripropylene glycol, oligomeric propylene glycols, polymeric propylene glycols, ethylene glycol, diethylene glycol, triethylene glycol, oligomeric polyethylene oxides, polymeric polyethylene oxides, neopentyl glycol, hydroxypivalic acid neopentyl glycol ester, 2-ethyl-2-methyl propanediol-1,3, 1,4-butanediol, 1,3-butanediol, 1,2-butanediol, 2,3-butanediol, 2-butyl-2-ethyl propanediol-1,3, 2-methyl propane-1,3-diol, 2,2,4-trimethyl pentanediol-1,3 2-ethyl-2-methyl propane-1,3-diol, 2,2-diethyl propanediol-1,3, 2-propyl-2-methyl propanediol-1,3, 1,5-petanediol, 1,6-hexanediol, cyclohexane dimethanol, tricyclodecane dimethanol, isosorbide, 2,2,4,4-tetramethyl cyclobutanediol-1,3 or any mixtures of those substances.

The vinyl ester urethane (a) can preferably also contain amino groups. The amino groups can particularly preferably be introduced by using chain extenders containing amino groups. Chain extenders containing amino groups may, for example, be diols and triols, and aminoalcohols with an NH structure and an additional tertiary amine. Examples of these chain extenders are bishydroxyethylaniline, bishydroxypropylaniline, N-methyl diethanolamine, N-tert.-butyl diethanolamine, N-methyl diisopropanolamine, N-tert.-butyl diisopropanolamine, 3-(diethylamino)-1,2-propanediol, N-hydroxyethyl piperazine, N,N'-bishydroxyethyl piperazine, N-hydroxy-propyl piperazine, N,N'-bishydroxypropyl piperazine, N,N-dimethyl-N',N'-bishydroxyethyl-1,3-diaminopropane, N,N-dimethyl-N',N'-bishydroxyethyl diaminoethane, triethanolamine, triisopropanolamine and mixtures thereof.

A preferable alternative is to use polyesterols, containing amino groups, as chain extenders, which are obtainable by, for example, the following reaction: maleic acid anhydride, maleic acid or fumaric acid are reacted with a stoichiometric excess of a diol, e.g. ethylene glycol, diethylene glycol, propylene glycol, dipropylene glycol or neopentyl glycol to a polyester with an acid value <1 mg KOH/g by melt condensation. The double bonds are reacted quantitatively or largely quantitatively in a subsequent Michael addition with a dialkylamine, e.g. dimethylamine, diethylamine, diisopropylamine. For this reaction, the dialkylamine is used stoichiometrically in an excess; after completion of the reaction, the excess of dialkylamine is withdrawn in a vacuum. The polyesterol formed, containing amino groups, is terminated with hydroxyl groups and can be used as a chain extender after the OH number has been determined.

In a preferred embodiment, a solvent, more preferably an aprotic solvent, can preferably be used to prepare the vinyl ester urethanes. Suitable examples are acetone or methylethylketone. A liquid homogeneous mixture is preferably prepared from hydroxypropyl methacrylate and/or hydroxyethyl methacrylate, the chain extender(s), a urethanisation catalyst and the solvent. For this purpose, the liquid isocyanate is added, preferably not exceeding a temperature of about 70° C. After that, the aprotic solvent can be removed before any other reactions. The vinyl ester urethane present in the aprotic solvent can preferably also be mixed with the component (b) described below without the removal step. The aprotic solvent is usually removed afterwards.

In an alternative preferred embodiment, tertiary aminofunctionalised component (b) without solvents can be used to prepare the vinyl ester urethanes or the corresponding curable composition. Suitable examples for this purpose are dimethylaminoethyl methacrylate, diethylaminoethyl methacrylate, dimethylaminoethyl acrylate, diethylaminoethyl acrylate and mixtures thereof. Preferably, a liquid homogeneous mixture of hydroxypropyl methacrylate and/or hydroxyethyl methacrylate, the chain extender(s), preferably a urethanisation catalyst and the tertiary aminofunctionalised component (b) are prepared. For this purpose, the liquid isocyanate is added, preferably not exceeding a temperature of about 70° C. After the reaction is completed, there is a curable composition present, comprising the vinyl ester urethane formed and the corresponding tertiary aminofunctionalised component (b).

In a preferred embodiment, the curable composition can contain vinyl ester urethane (a) and the component (b) described below, where in this case the curable composition can be referred to as VEU resin. The curable composition can preferably be present in liquid form at 25° C. Radical curing usually results in a covalent compound of components (a) and (b). After curing of the VEU resin, one usually speaks of a VEU duromer or VEU network.

Vinyl esters and vinyl ester urethanes have major structural features in common: for example, they carry the radically reactive double bonds in the form of a methacrylate function at the chain end of the compound in each case.

These can preferably be linear epoxides and urethanes with two chain ends each, or they may be trifunctional with three chain ends each, tetrafunctional with four chain ends each, and so on. Mixtures can also be employed.

As a result, the following advantages may preferably be achieved: after cross-linking, VE duromers and VEU duromers possess relatively few free chain ends in the network. This enhances the chemical resistance and the tenacity of the network. The vinyl esters and vinyl ester urethanes also have a narrow and sharply defined glass transition, so that the two classes of substances are regarded as a unit in the resin-producing and resin-processing industry.

In the curable composition of the invention, component (b) is a methacrylate or acrylate selected from tert.-butylaminoethyl methacrylate, dimethylaminoethyl methacrylate, diethylaminoethyl methacrylate, tert.-butylaminoethyl acrylate, dimethylaminoethyl acrylate, diethylaminoethyl acrylate and mixtures thereof. Component (b) is preferably a methacrylate selected from tert.-butylaminoethyl methacrylate, dimethylaminoethyl methacrylate, diethylaminoethyl methacrylate, and mixtures thereof, more preferably tert.-butylaminoethyl methacrylate.

Component (b) preferably includes a secondary or tertiary amine, especially a secondary amine, and is thus aminofunctionalised. Since component (b) generally reacts with component (a) in a broad range of compositions, the content of aminofunctionalised component (b) can advantageously be used to control the content of secondary or tertiary amino functions in the cured product formed. In this way, it is possible to adjust the strength of the antimicrobial properties of the product.

In a preferred embodiment, the curable composition of the invention may also contain a reactive diluent (c) in addition to compound (a) and component (b). The reactive diluent (c), for the purposes of the invention can be both a single suitable monomer and any suitable mixture of monomers. It is preferable that the monomer or the mixture of monomers allow radical cross-linking and can be completely or more or less completely incorporated into the network. This reactive diluent can, for example, be styrene, alpha-methyl styrene, vinyl toluene, tert.-butyl styrene, 4-vinyl pyridine, 3-vinyl pyridine, 2-vinyl pyridine, methyl methacrylate, divinyl benzene, 1,2,4-trivinyl cyclohexane, diallyl phthalate, diallyl isophthalate, trisallyl isocyanurate.

In a preferred embodiment, the curable composition may contain components (a and b) and component (c) in a ratio of 20:80 to 100:0. The ratio is preferably selected such that the resulting cured composition has an antimicrobial effect. In particular, the antimicrobial effect of the cured composition is what is known as an intrinsically antimicrobial effect. This means that the antimicrobially active groups are covalently bound to the polymer and are not or at least not exclusively incorporated into the polymer by the addition of additives.

In a preferred embodiment, component (c) is not contained in the curable composition.

The curable compositions of the invention can per se be used in the methods or applications described below. Alternatively, mixtures of the curable composition of the invention with conventional curable compositions, not equipped with antimicrobial properties, can also be used for UP resins, VE resins, VEU resins and methacrylate resins, preferably as long as the antimicrobial effect is maintained.

In the curable composition of the invention, the ratio of compound (a) with a reactive double bond to (b) methacrylate or acrylate is not usually limited. In a preferred embodiment, compound (a) contains 0.5 to 8, preferably 0.7 to 7, more preferably 1 to 6, even more preferably 1.5 to 4, especially 1.75 to 3.5 methacrylate or acrylate molecules (component (b)) per double bond in the composition. If the number is lower, the composition might perhaps become too highly viscous, or there may be too inadequate cross-linking. If the number is higher, it may be that the composition perhaps becomes too low-viscosity or that methacrylate or acrylate molecules do not react completely during the cross-linking reaction and free residual monomer can diffuse out of the product or the surface. In order to prevent this, the content of residual monomer should preferably be lowered by lengthy post-curing at an elevated temperature.

In the present composition, there are preferably 0.5 to 8 methacrylate or acrylate molecules (component (b)) in compound (a) per double bond. To put it another way, the ratio of methacrylate or acrylate molecules (component (b)) to double bonds from compound (a) is preferably 0.5:1 to 8:1. The number of methacrylate or acrylate molecules (component (b)) or the number of double bonds in compound (a) is proportional to the corresponding molecular mass, so that the ratio mentioned can also be calculated using that.

The molar ratio of component b) to the radically reactive double bonds of component a) can be calculated as follows:

In an unsaturated polyester of type $ITS_1NPG_{0.5}CHDM_{0.5}$, the constitutive repeat unit has a molecular weight $$M_R = M_{ITS} + 0.5 * M_{NPG} + 0.5 M_{CHDM} - 2 * M_{H2O}$$

The conclusion to be drawn from this is:

$$M_R = 130.1 \text{ g/mol} + 0.5 * 104.2 \text{ g/mol} +$$
$$0.5 * 144.2 \text{ g/mol} - 2 * 18 \text{ g/mol} = 218.3 \text{ g/mol}$$

If for 1 mol radically reactive double bond (corresponding to 218.3 g) an amount of substance of 2.5 mol TBAEMA ($M_{TBAEMA}$=185.3 g/mol) is used, this means that 218.3 g unsaturated polyester are mixed with the mass TBAEMA ($m_{TBAEMA}$) of $$m_{TBAEMA} = M_{TBAEMA} * n_{TBAEMA}$$
$$= 185.3 \text{ g/mol} * 2.5 \text{ mol}$$
$$= 463.3 \text{ g}$$

The TBAEMA content of this mixture is 463.3 g/(463.3 g+218.3 g)=0.6797 corresponding to about 68% by weight.

In a vinyl ester urethane of type $HPMA_1MDI_{1.01}DPG_{0.5}$, which is composed of 1 mol HPMA ($M_{HPMA}$=144.2 g/mol), 1 mol MDI ($M_{MDI}$=250.3 g/mol) and 0.5 mol DPG ($M_{DPG}$=134.2 g/mol), this results in 144.2 g+250.3 g+0.5*134.2 g=461.6 g product, which contains 1 mol radically reactive double bonds. If one adds 2.5 mol TBAEMA (corresponding to 463.3 g), the mass fraction of TBAEMA in the curable composition is 0.5, corresponding to 50% by weight.

The excess of 1 mol % MDI is disregarded in the calculation. It is chosen for experimental reasons in order to compensate for MDI losses in the dropping funnel and for isocyanate losses resulting from the residual water content in the HPMA and the chain extenders.

The curable composition can preferably contain 20% by weight to 100% by weight of a mixture of compound (a) and component (b). In a preferred embodiment, the curable composition contains from 20% by weight to 50% by weight of a mixture of compound (a) and component (b). In an alternative preferred embodiment, the curable composition contains from 50% by weight to 80% by weight of a mixture of compound (a) and component (b). In an alternative preferred embodiment, the curable composition contains from 80% by weight to 80% 100% by weight of a mixture of compound (a) and component (b).

In addition, the composition of the invention can contain not only the reactive diluent (c) already mentioned, but for example other monomers, oligomers, polymers, light stabilisers, initiators, additives, pigments, release agents, rheology additives, fibres and/or fillers.

In a preferred embodiment the curable composition can contain a radical initiator. The radical initiator is preferably a photoinitiator or thermal initiator.

Preferred photoinitiators can form a C radical. Photoinitiators can preferably be derivatives of benzoin, benzil or an α-hydroxyketone or an α-aminoketone or an acyl phosphine oxide or a bisacyl phosphine oxide.

The thermal radical initiator is preferably not a peroxide radical initiator.

Preferred alternatives are thermal initiators of the azoinitiator type, e.g. 2,2'-azobis(2-methyl propionitrile), also known as AIBN, 1,1'-azobis(cyclohexane-1-carbonitrile) or dimethyl-2,2'-azobis(2-methyl propionate) and C—C-labile compounds, e.g. 2,3-dimethyl-2,3-diphenyl butane, 3,4-dimethyl-3,4-diphenyl hexane or mixtures of different initiators.

The curable composition of the invention can preferably contain 0.01 to 4.0% by weight, more preferably 0.1 to 3.5% by weight, especially 0.5 to 3.0% by weight of radical initiators, based on the total weight of the composition.

In an alternative embodiment, curing of the curable composition of the invention is still possible even without an initiator. As a preferred alternative, the curing can be carried out thermally, for example, or with high-energy radiation (α, β or γ radiation).

In a preferred embodiment, the curable composition of the invention can contain fillers. Fillers are solid organic or inorganic substances and mixtures thereof which increase the volume of the curable composition and the product obtainable from it. Fillers are usually inactive substances and do not change the properties of the curable composition and the product obtainable from it. Examples of fillers are cork, wood flour, stone meal, aluminium oxide, magnesium oxide, calcium carbonate, carbon black, sodium sulphate, silicates such as talc, mica, kaolin, mineral chalk and ground plastics and mixtures thereof.

The fillers can preferably be contained in amounts of 0 to 60% by weight, preferably 2 to 50% by weight, more preferably 5 to 45% by weight, especially 10 to 40% by weight, based on the total weight of the curable composition of the invention.

In addition, the curable composition of the invention can preferably contain fibres. These fibres can preferably be regarded as reinforcement materials. Suitable fibres are, for example, glass fibres, carbon fibres, aramid fibres, basalt fibres, natural fibres or non-woven textiles.

The fibres can be contained in amounts of 0 to 60% by weight, preferably 1 to 55% by weight, more preferably 5 to 50% by weight, especially 10 to 45% by weight, based on the total weight of the curable composition of the invention.

Other additives (d), such as light stabilisers, shrinkage-reducing thermoplastic polymers, thickening agents, release agents, skin-forming agents and waxes can be used, depending on the processing method and application concerned.

In a preferred embodiment, the curable composition of the invention contains 20 to 100% by weight, preferably 30 to 99% by weight, more preferably 40 to 98% by weight, of the mixture of components (a) and (b)

0 to 80% by weight, alternatively 0 to 60% by weight, further alternatively 1 to 40% by weight reactive diluent (c)

0 to 4% by weight, preferably 0.1 to 3% by weight initiator 0 to 60% by weight, alternatively 2 to 50% by weight, further alternatively 5 to 45% by weight filler 0 to 60% by weight, alternatively 1 to 55% by weight, further alternatively 5 to 50% by weight fibres 0 to 10% by weight, alternatively 1 to 5% by weight additives (d).

In a preferred embodiment, the composition of the invention can be used, for example after the addition of additives, fibres and fillers, to prepare products such as sheet moulding compounds (SMC) and bulk moulding compounds (BMC) and other compounds.

A further subject matter of the present invention is the use of the curable composition of the invention in a processing method, preferably in one of the following processing methods: coating, painting, casting, dip coating, laminating, gap impregnation, centrifugation, bonding, resin injection, pressing, injection moulding, pultrusion, filling and levelling, and winding.

A further subject matter of the invention is the use of the curable composition of the invention and/or the products resulting therefrom in, for example, the furniture industry, medicine and the health sector, the medical engineering industry, in hospitals, doctors' surgeries, old people's homes and rehabilitation centres, in domestic nursing and care of the elderly and sick, in the food and meat-producing, processing and packing industry, in the packaging industry, in warehousing and logistics, in the sealing industry, in animal breeding and agriculture and domestic pet care, in the pharmaceutical industry, the domestic goods industry, the construction of equipment, containers and pipelines, in the electrical, automotive and construction industries, the aerospace industry, the textile industry, the hygiene products industry, the sanitary products industry, in the sport, toy and leisure articles industries, in shipbuilding, in boat construction, the water sports industry, ventilation and air conditioning technology, public, domestic and industrial water supply, or water treatment.

The present invention also relates to a method for producing cured products, wherein the curable composition of the invention is cured. The cured products obtained preferably have antimicrobial properties, especially intrinsically antimicrobial properties.

In a preferred embodiment the composition of the invention can be cured in the presence of a solvent. Examples of suitable solvents are ethyl acetate, butyl acetate, acetone and methyl ethyl ketone.

In an alternative embodiment, the curing can also be carried out in the absence of a solvent.

The curing can preferably be carried out in the presence of a radical initiator with subsequent thermal curing at 40° C. to 160° C. What has been described above applies to the radical initiator. In the event that there is a radical initiator present, the curing of the curable composition of the invention can be carried out at temperatures of 30° C. to 230° C., preferably 30° C. to 200° C., more preferably 40° C. to 180° C.

Alternatively, the curing can also be carried out in the absence of a radical initiator. The curing can, for example, be carried out by applying thermal energy. Preferably, temperatures of 50° C. to 200° C., more preferably 70° C. to 190° C., especially 80° C. to 180° C. can be used.

In a further embodiment, the curing can be carried out by high-energy radiation, such as electron radiation.

A further subject of the invention is a product with an antimicrobial effect, which is obtaining by curing the curable composition of the invention. During curing, all or some of the reactive double bonds occurring in the curable composition of the invention can react, so that components (a) and (b) are cross-linked.

The product of the invention, such as a UP duromer, VE or VEU duromer, is preferably obtained by the method of the invention for preparing cured products. A UP duromer consists, for example, of the polyester and oligomeric bridge structures which have formed from component (b) and which preferably mainly have an average chain length of 1.5 to 4 monomeric units of component (b).

The modulus of elasticity of the UP duromer, VE or VEU duromer of the invention advantageously lies within a range of 2,000 to 4,000 N/mm². The duromers mentioned advantageously exhibit an elongation within a range of 0.5 to 6%. They are preferably odorless.

The product of the invention may be fibre-reinforced or not reinforced, filled with fillers or unfilled and, irrespective of that, can be employed in the most varied kinds of technical applications, in the food industry, in hospitals and medical equipment, in refrigerators, cold stores and many other fields. The product of the invention also exhibits antimicrobial behaviour. The antimicrobial behaviour is an intrinsic material property and is preferably caused by a covalent bond of the group on the polymer with biocidal activity. The intrinsically antimicrobial effect is thus not (or at least not exclusively) caused by conventional biocides introduced as additives. In this respect, the composition of the invention and the products obtained from it differ significantly from the present state of the art in plastics equipped with biocidal properties, which usually work with nanosilver, isothiazolinones, organic chlorine compounds, triazine derivatives, compounds of copper, tin, zinc and arsenic and other active agents. These conventional biocides are controversial because of their (usually slow) release into the environment, in some cases poor biodegradability, heavy-metal content, possible accumulation in certain organisms and/or distribution and dispersion via the food chain. With the novel intrinsically antimicrobial products, these disadvantages are reliably avoided.

In a preferred embodiment, the product of the invention with an antimicrobial effect exhibits a water absorption after one day of 0 to 15%, preferably 0.3 to 14%, more preferably 0.5 to 13%, especially 0.7 to 12%.

In an alternatively preferred embodiment, the product of the invention with the antimicrobial effect exhibits a water absorption after seven days of 0.5 to 35%, preferably 1 to 34%, more preferably 1.5 to 33%, especially 2 to 32%.

The water absorption is determined in line with the DIN EN ISO 62:2008-05 standard. For this purpose, a square test specimen (50×50×5 mm) of an antimicrobial product in accordance with the invention is placed in a 1 l brown glass flask and dried for 16 hours at 50° C. in order to yield the mass $m_o$. After the drying step, 500 ml completely demineralised water is poured into the flasks. The mass of the test specimens is determined after either one or seven days ($m_1$ or $m_7$). To do this, the test specimens are dried with a cloth and then weighed. The water absorption of the respective antimicrobial product in % after one or seven days can be determined from the masses $m_0$ and $m_1$ or $m_0$ and $m_7$.

In order to determine the water absorption, square plates (50×50×5 mm) were cured. The curing is UV curing and is oxygen-free. The curable composition concerned is placed in a brown glass flask with 1.75% by weight of the UV initiator Irgacure 819 (bis(2,4,6-trimethylbenzoyl)phenylphosphine oxide), and the flask is placed on a rolling stand until the initiator has dissolved completely. A plastic construction is made in order to be able to cure a square test specimen with the dimensions 50×50×5 mm After the construction has been assembled, the curable composition is poured into the mould. In order to ensure oxygen-free curing, the construction is purged with nitrogen for 5 minutes in a sealed plastic container. That was followed by an exposure time of 15 minutes in the Suntester from Original Hanau, while purging with nitrogen continued without interruption. After the 15 minutes, the underside of the test specimen is still soft, but not tacky, so that all the test specimens are exposed again from the other side for 5 minutes.

In a preferred embodiment, the product of the invention with an antimicrobial effect exhibits a glass transition temperature $T_G$ (measured at 1 Hz) of 40° C. to 140° C., preferably 45° C. to 130° C., especially 50° C. to 120° C.

In a preferred embodiment, the product of the invention with an antimicrobial effect exhibits a glass transition temperature $T_G$ (measured at 10 Hz) of 50° C. to 150° C., preferably 55° C. to 140° C., especially 60° C. to 120° C.

The glass transition temperature has a decisive influence on the material properties of a product. This is characterised by the transition from a hard, brittle, glassy state to a viscoelastic body or vice versa. Below the glass transition temperature, the chain segments are rigid and immobile, which explains the brittle and hard state. The $T_G$ is determined above all by the chemical structure of the network and the cross-linking density.

The DMA 242 from Netzsch which was used makes it possible to determine the storage and loss modulus and the loss factor of a sample as a function of temperature, time and the frequency of a sinusoidal vibration load applied.

The resins prepared in the worked embodiments, mixed with 2% by weight initiator (V601 from Wako) were used to prepare the test specimens required.

For this purpose, three 15×15 cm layers of Saertex® glass-fibre mats (biaxial 0°/90°/type: S14EB540-00620-T1300-487000) were impregnated with the respective resin, placed in a 150×150×5 mm screw-fastenable plate mould lined with Mylar® film, and air bubbles were forced out as far as possible by pressing with a spatula. After that, the cavity of the mould was completely filled with more resin, covered with Mylar® film and sealed with the upper mould plate by screw-fastening. The curing was carried out at 70, 80, 90° C. and 120° C. in a drying oven for 2 h in each case, with oxygen excluded.

After cooling, the GFP plates are cut to size with a bench circular saw and where necessary reduced to the required sample size with a grinding belt.

Parameters and measurement settings in the DMA-20 analyses conducted:
Sample dimensions: 50×10×5 mm
Deformation mode: twin-arm bending
Amplitude: 30 μm
Dynamic force: 7.5 N Static force: 4 N
Temperature range: 20-180° C.
Heating rate: 2 K/min
Frequency: 1 Hz/10 Hz
Atmosphere: $N_2$
$N_2$ flow rate 5 ml/min A further subject matter of the invention is the use of the curable composition of the invention in preparing the following products, for example: furniture and furniture surfaces, adhesives, veneers and paper laminates, buttons, handles, push buttons, switches and housings, plates, flooring, pipes, profiles, tanks and containers of all kinds, especially for drinking water, foodstuffs and oils, linings of all kinds, roof coatings, light panels, sealing compounds, putties, dowel compounds, polymer concrete, agglomerated marble, kitchen sinks, shower trays, bath tubs, wash basins, lavatory seats, garden furniture, garden fences, façade panels, cellar window shafts, vehicle parts, luminaires, wind power plants, impregnations, binders, grouting compounds, filling compounds and/or reaction mortar, coatings, varnishes, gelcoats, topcoats, ships, boats, leisure articles. The product of the invention is preferably used to prepare adhesives, sealing compounds, grouting compounds, coatings or moulded articles, especially to prepare antimicrobial coatings and moulded articles.

EXAMPLES

The invention will now be illustrated with reference to the following examples. In this context, a general production method will first be described in sections 1 and 2. In section 3, measuring the antimicrobial activity is explained, and in section 4 the results of the products produced are summed up.

1.1 Preparation of the Unsaturated Polyester (a)

For the purposes of preparation, the same condensation conditions were selected in each case in order to ensure that the products were easily comparable. The precise composition of the polyesters prepared can be seen from the table of results in item 4.

The respective diols, the itaconic acid, 400 ppm Fascat 4100 (butyl tin acid) as an esterification catalyst and 300 ppm hydroquinone as an inhibitor were poured into a 2 l four-necked flask, which was clamped beneath the stirrer. In order to prevent the educts from distilling off, a packed column was used. Purging with nitrogen continued throughout the entire reaction time in order to prevent gelling and at the same time to support the removal of the water of condensation. There was a thermometer in the flask to monitor the temperature accurately. The raw materials were then melted at 100° C. As soon as the melt was stirrable, the temperature was raised to 140° C. and kept there for one hour, then raised to 150° C. and kept there for 0.75 hours. The temperature was then raised to 160° C. and increased by 10° C. every half hour up to a temperature of 180° C. The temperature was kept at 180° C. for 0.5 hours, then raised to 185° C. and kept there for six hours. The water of condensation formed during the reaction was trapped in order to be able to assess the progress of the reaction.

1.2 Preparation of the Vinyl Ester Urethanes (a)

0.25 g (600 ppm) 3,5 di-tert.-butyl-4-hydroxyl toluene (BHT), 0.03 g (60 ppm) 4-methoxyphenol (HQME), 57.68 g (0.4 mol) 2-hydroxypropyl methacrylate (HPMA), 0.2 mol of the chain extender (tert.-butyl-bis-hydroxyethylamine or dipropylene glycol) and 200 ml anhydrous acetone were poured into a three-necked flask. The mixture was heated to 65° C. with constant stirring. Once the reaction temperature had been reached, 101.08 g (0.404 mol) Lupranat MI from BASF SE (49% by weight 4,4'-methylene diphenyl diisocyanate, 49% by weight 2,4'-methylene diphenyl diisocyanate, 2% by weight 2,2'-methylene diphenyl diisocyanate) were added dropwise in such a way that the reaction mixture reached a constant temperature of between 65° C. and 75° C. The heat created was dissipated via a water bath. After everything had been added dropwise (25 minutes), the mixture was stirred for another 1 hour.

1.3 Vinyl Ester (a)

In the present experiments, (1-methylethylidene)bis[4,1-phenyleneoxy(2-hydroxy-3,1-propanediyl)]bis methacrylate (M=512.59 g/mol) was used as the vinyl ester, obtainable from Sigma Aldrich, product number: 494356.

2. Preparation of the Curable Composition and of the Cured Product 2.1 In order to prepare the curable composition (UP resin), the corresponding amount of acrylate and/or methacrylate component (b) was added to the unsaturated polyester (a). After rotating on a rolling stand, a transparent resin was left after approx. 14 days.

2.2 In order to prepare the curable composition (VEU resin), the corresponding amount of acrylate and/or methacrylate component (b) was added to the vinyl ester urethane (a), and the acetone only at normal pressure and then stripped in a vacuum until the total mass in the flask remained constant.

2.3 In order to prepare the curable composition (VE resin), the corresponding amount of acrylate and/or methacrylate component (b) was added to the vinyl ester (a).

After that, 1.75% by weight of the UV initiator Irgacure 819 was added to each composition prepared and dissolved. About 8 g of the transparent solution mixed with initiator were placed on various glass Petri dishes and exposed for five minutes in a Suntester from Original Hanau under a nitrogen atmosphere in order to obtain a cured sample. The fully cured product obtained (duromer) was tack-free and hard. The product was virtually odorless and exhibited excellent antimicrobial properties.

3. Examination of the Antimicrobial Property

The method used in the antimicrobial examinations is based on the Japanese Standard JIS Z 2801:2000. The test microorganism for the experiments was the pathogenic germ *Staphylococcus aureus*. A standard germ (ATCC 6538) was used, which is not multiresistent.

With each test germ (in this case *Staphylococcus aureus*), a microorganism-specific germ count is adjusted under the conditions under which the starting solution or starting suspension was prepared. In the case of *Staphylococcus aureus*, that figure was $10^8$ germs per ml (see also comments below).

The antimicrobial activity was determined by comparing the growth of Staphylococcus *aureus* on reference surfaces and on the sample materials.

Empty Petri dishes were used as the reference material. The samples consisted of Petri dishes into each of which was poured a thin layer of a polymer sample. For each test series, three reference plates were used to determine the initial germ count (separate experiment, independently of the examination into the antimicrobial behaviour) and three reference plates and three sample plates to determine the surface germ count after incubation.

All the plates were inoculated with 400 µl *Staphylococcus aureus* inoculation suspension, which had been adjusted to a germ count of $4.0\text{-}10 \cdot 10^5$ CFU/ml.

The inoculation suspension applied was covered with a sterile PP film in order to avoid evaporation. Immediately after inoculation, the three sample plates and three reference plates were transferred to an incubation cabinet and stored for 2 h or 24 h at 35° C. and 90% relative humidity.

In order to determine the germ count in the inoculation solution (initial germ count), three reference plates each were washed out immediately after inoculation, with 10 ml SCDLP broth (soybean casein peptone broth with lecithin and polyoxyethylene medium) added to the Petri dish. The film was turned over with sterile tweezers and rinsed top and bottom several times with a 1 ml pipette. The Petri dish was swirled in the form of a figure of eight before 1 ml of the rinsing solution was pipetted into the first dilution stage. After a dilution series had been prepared, the live germ count was determined by means of the drop plate method. In the drop plate method 5 drops per 10 µl—using twin batches—were placed on a plate-count (PC) agar plate in each sector of the dilution stage concerned. The plates were incubated for 2 h and 24 h respectively at 37° C.

The steps of rinsing and determining the live germ count on the reference and sample plates after incubation were carried out in the same way in which the initial germ count was determined. In the case of the sample plates, in order to enhance the detection threshold, the germ count in the direct rinsing solution was determined using the pour plate method. For this purpose, again using twin batches, 1 ml of the solution was poured into an empty Petri dish, and liquid PC agar, heated to 45° C., was poured over it. The bacteria were distributed in the agar by swirling the dish in the form of a figure of eight. The plates were incubated for 48 h at 37° C.

After the incubation, the colonies in the Petri dish were counted. It was assumed that a visible colony had formed from each germ. The colonies were visible with the naked eye after incubation. Alternatively, it was possible to use a light table so that the germs could be recognised better.

On the basis of the volume of the inoculation solution and the dilution ratios used, it was possible to draw conclusions as to the live germ count of the microorganisms per unit of volume (i.e. per ml) inoculation solution. The calculation was performed on the basis of the weighed arithmetical average with the following formula:

$$\bar{c} = \frac{\Sigma c}{n_1 \cdot 1 + n_2 \cdot 0, 1} \cdot d$$

where
$\bar{c}$ weighed arithmetical average
$\Sigma c$ sum of the colonies on all Petri dishes or sectors included in the calculation
$n_1$ number of Petri dishes or sectors in the lowest analysable dilution stage
$n_2$ number of Petri dishes or sectors in the next-higher dilution stage
d factor of the lowest analysable dilution stage With the pour plate method, Petri dishes with up to 300 CFU (colony-forming units) could be counted. With the drop plate method, only plates with up to 150 CFU per sector were analysable.

When determining the live germ count per ml, the dilution factor $F_1$ had to be taken into account. That resulted from the sum of the volume of the SCDLP broth and the volume of the bacteria suspension on the inoculated plate divided by the volume of the bacteria suspension on that inoculated plate.

$$F_1 = \frac{10 \text{ ml} - 0,4 \text{ ml}}{0,4 \text{ ml}} = 26$$

$F_1$ dilution factor of the SCDLP broth.

For the total germ count on the inoculated sample and reference plates in the pour plate method, this resulted in the following formula:

$$KbE = \frac{\Sigma c}{n_1 \cdot 1 + n_2 \cdot 0, 1} \cdot d \cdot F_1$$

KbE CFU

In the drop plate method, only one further dilution factor was relevant, since a quarter of a plate was only inoculated with 50 µl, i.e. 0.05 ml. In order to draw conclusions about the germ count per ml, 0.05 ml had to be recalculated to 1 ml by multiplying by 20.

$$F_2 = 26 \cdot 20$$

$F_2$ dilution factor to obtain the CFU per ml in the drop plate method.

The total germ count on the inoculated sample and reference plates in the drop plate method was thus calculated, taking all the dilution factors into account, according to the following formula:

$$KbE = \frac{\Sigma c}{n_1 \cdot 1 + n_2 \cdot 0, 1} \cdot d \cdot F_2$$

In order to calculate the antimicrobial activity, the individual results of the live germ count for the plates in each test series were summed up as a simple arithmetical average and from this the $\log_{10}$ reduction between sample and reference plates was determined.

The calculation was performed using the following formula:

$$\log_{10}\text{-reduction} = \log_{10}(KG)_{Ref(x)} - \log_{10}(KG)_{Pr(x)}$$

where
$(KG)_{Ref(x)}$ is CFU on the reference plates at time x and
$(KG)_{Pr(x)}$ is CFU on the sample plates at time x.

According to JIS Z 2801:2000, an antimicrobial activity is present at a log reduction of at least 2.0 after 24 hours of reaction time.

If there were no countable colonies present on the agar plates with the samples at the lowest dilution stage in the pour plate method, the result was stated as <10 CFU/ml in accordance with the requirements in the test standard.

4. Components, Composition, Characterisation and Results of the Dynamic/Mechanical and Antimicrobial Examinations of the Cured products:

| Polyester, vinyl ester urethane, vinyl ester (a) | | | | Mass-average molecular weight (Mw) [g/mol] | Component (b) | | | Product | | | Antimicrobial efficacy | | |
|---|---|---|---|---|---|---|---|---|---|---|---|---|---|
| Composition[i] | Average molecular weight per reactive double bond [g/mol] | Acid value [mg KOH/g UP] | Melt viscosity[j] [mPas] | | Name | Mole content | [% by weight] | Water absorption after 7 days [%] | Glass transition temperature $T_G$ at 10 Hz [° C.] | Initial germ count (log CFU/ml) | Reference germ count after 24 h (log CFU/ml) | Surface germ count sample after 24 h (log CFU/ml) | Log reduction |
| ITS₁HPN₀.₅NPG₀.₅ | 248.3 | 44.1 | 90 (10,000 1/s) | 5,102 | TBAEMA | 1.34 | 50 | 5.98 | 77.6 | 5.4 | 7 | 2.1 | 4.9 |
| ITS₁HPN₀.₅NPG₀.₅ | | | | | TBAEMA | 1.64 | 55 | 7.00 | 82 | 5.4 | 7 | 1 | 6 |
| ITS₁HPN₀.₅NPG₀.₅ | | | | | TBAEMA | 2.01 | 60 | 7.77 | 85.2 | 5.4 | 7 | 1.8 | 5.2 |
| ITS₁HPN₀.₅NPG₀.₅ | | | | | TBAEMA | 2.49 | 65 | 7.74 | 86.9 | 5.3 | 7.3 | 2.7 | 4.6 |
| ITS₁HPN₁ | 298.4 | 44.4 | 45 (10,000 1/s) | 4,178 | TBAEMA | 1.61 | 50 | 8.88 | 74.5 | 5.3 | 7.1 | 1 | 6.1 |
| ITS₁HPN₁ | | | | | TBAEMA | 1.96 | 55 | 9.85 | 84.4 | 5.5 | 7.3 | 1 | 6.3 |
| ITS₁HPN₁ | | | | | TBAEMA | 2.42 | 60 | 8.54 | 67.7 | 5.5 | 7.3 | 1 | 6.3 |
| ITS₁HPN₁ | | | | | TBAEMA | 3 | 65 | 15.61 | 63.6 | 5.4 | 7.3 | 1 | 6.3 |
| ITS₁HPN₀.₅CHDM₀.₅ | 268.3 | 31.5 | 290 (10,000 1/s) | 8,786 | TBAEMA | 1.45 | 50 | 2.89 | 88.7 | 5.3 | 7.3 | 1 | 6.3 |
| ITS₁NPG₀.₅CHDM₀.₅ | 218.3 | 31.7 | 620 (5,000 1/s) | 7,894 | TBAEMA | 1.43 | 55 | 2.78 | 94.1 | 5.3 | 7.4 | 1.3 | 6.1 |
| ITS₁NPG₀.₅CHDM₀.₅ | | | | | TBAEMA | 1.77 | 60 | 4.84 | 92.1 | 5.3 | 7.3 | 3 | 4.5 |
| ITS₁HPN₀.₅TCDDM₀.₅ | 294.3 | 27.1 | 470 (10,000 1/s) | 10,069 | TBAEMA | 2.38 | 60 | 3.21 | 89.2 | 5.3 | 7.4 | 2.9 | 4.5 |
| ITS₁NPG₀.₅TCDDM₀.₅ | 244.3 | 27.5 | 700 (2,500 1/s) | 10,571 | TBAEMA | 1.61 | 55 | 2.87 | 91.1 | 5.4 | 7.7 | 1 | 6.7 |
| ITS₁Dianol220₁ | 410.5 | 12.8 | 720 (2,500 1/s) | 50,230 | TBAEMA | 3.32 | 60 | — | 68.2 | 5.3 | 7.5 | 1 | 6.5 |
| ITS₁Dianol220₁ | 198.3 | 46.5 | 260 (10,000 1/s) | — | TBAEMA | 4.11 | 65 | 8.64 | 67.4 | 5.3 | 7.5 | 1 | 6.5 |
| ITS₁NPG₁.₀ | | | | | TBAEMA | 2.5 | — | 5.89 | 85.7 | 5.3 | 7.7 | 3.9 | 3.8 |
| ITS₁NPG₀.₉CHDM₀.₁ | 202.3 | 49.7 | 280 (10,000 1/s) | 4,363 | TBAEMA | 2.5 | — | 6.14 | 93.4 | 5.3 | 7.7 | 3 | 4.7 |

-continued

| Composition[1] | Polyester, vinyl ester urethane, vinyl ester (a) | | | | | Mass-average molecular weight (Mw) [g/mol] | Component (b) | | | Product | | | Antimicrobial efficacy | | | |
|---|---|---|---|---|---|---|---|---|---|---|---|---|---|---|---|---|
| | Average molecular weight per reactive double bond [g/mol] | Acid value [mg KOH/g UP] | Melt viscosity[1] [mPas] | | | | Name | Mole content | [% by weight] | Water absorption after 7 days [%] | Glass transition temperature T_G at 10 Hz [° C.] | Initial germ count (log CFU/ml) | Reference germ count after 24 h (log CFU/ml) | Surface germ count sample after 24 h (log CFU/ml) | Log reduction |
| ITS₁NPG₀.₈CHDM₀.₂ | 206.3 | 47.3 | 600 | | | 4,434 | TBAEMA | 2.25 | — | 5.73 | 94.2 | 5.3 | 7.7 | 3.9 | 3.8 |
| ITS₁NPG₀.₈CHDM₀.₂ | | | (10,000 1/s) | | | | TBAEMA | 2.5 | — | 5.18 | 91.3 | 5.3 | 7.7 | 3 | 4.7 |
| ITS₁NPG₀.₇CHDM₀.₃ | 210.3 | 43.4 | 970 (10,000 1/s) | | | 4,914 | TBAEMA | 2.5 | — | 4.71 | 87.9 | 5.3 | 7.7 | 4.5 | 3.2 |
| ITS₁NPG₀.₆CHDM₀.₄ | 214.3 | 42.2 | 480 (10,000 1/s) | | | 6,008 | TBAEMA | 2.5 | — | 4.14 | 97.3 | 5.4 | 7.7 | 4.2 | 3.5 |
| ITS₁NPG₀.₅CHDM₀.₅ | 218.3 | 41.7 | 580 (10,000 1/s) | | | 5,901 | TBAEMA | 2.5 | — | 4.21 | 95.7 | 5.3 | 7.7 | 4.8 | 2.9 |
| ITS₁NPG₀.₄CHDM₀.₆ | 222.3 | 33.1 | 900 (2,500 1/s) | | | 6,422 | TBAEMA | 2.5 | — | 4.48 | 91.7 | 5.3 | 7.7 | 5.3 | 2.4 |
| HPMA₁MDI₁.₀₁TBBHEA₀.₅ | 475.0 | | — | | | | DMAEMA | 4.53 | 60 | 6.79 | 98.8 | 5.3 | 8 | 2 | 6 |
| HPMA₁MDI₁.₀₁TBBHEA₀.₅ | | | | | | | DMAEMA | 5.61 | 65 | 17.26 | 92.1 | 5.3 | 8 | 1 | 7 |
| HPMA₁MDI₁.₀₁TBBHEA₀.₅ | | | | | | | TBAEMA | 2.56 | 50 | 1.03 | 109.2 | 5.3 | 8 | 1 | 7 |
| HPMA₁MDI₁.₀₁TBBHEA₀.₅ | | | | | | | TBAEMA | 3.13 | 55 | 1.37 | 98.6 | 5.3 | 8 | 1 | 7 |
| HPMA₁MDI₁.₀₁TBBHEA₀.₅ | | | | | | | TBAEMA | 3.84 | 60 | 1.48 | 106.1 | 5.3 | 8 | 1.1 | 6.9 |
| HPMA₁MDI₁.₀₁TBBHEA₀.₅ | | | | | | | TBAEMA | 4.76 | 65 | 1.96 | 92.4 | 5.3 | 8 | 1 | 7 |
| HPMA₁MDI₁.₀₁TBBHEA₀.₅ | | | | | | | TBAEMA | 5.98 | 70 | 2.71 | 97.7 | 5.3 | 8 | 1 | 7 |
| HPMA₁MDI₁.₀₁DPG₀.₅ | 461.5 | | — | | | | DMAEMA | 3.59 | 55 | 4.89 | 105.5 | 5.3 | 8.1 | 5.1 | 3 |
| HPMA₁MDI₁.₀₁DPG₀.₅ | | | | | | | DMAEMA | 5.45 | 65 | 11.39 | 94.3 | 5.3 | 8 | 1 | 7 |
| HPMA₁MDI₁.₀₁DPG₀.₅ | | | | | | | DMAEMA | 6.85 | 70 | 32.76 | 85.8 | 5.3 | 8 | 1 | 7 |
| HPMA₁MDI₁.₀₁DPG₀.₅ | | | | | | | TBAEMA | 2.49 | 50 | 1.26 | 104.1 | 5.3 | 8.1 | 1.5 | 6.6 |
| HPMA₁MDI₁.₀₁DPG₀.₅ | | | | | | | TBAEMA | 3.04 | 55 | 1.33 | 100.2 | 5.3 | 8.1 | 1.2 | 6.9 |
| HPMA₁MDI₁.₀₁DPG₀.₅ | | | | | | | TBAEMA | 3.73 | 60 | 2 | 99.2 | 5.3 | 8.1 | 1 | 7.1 |

-continued

| Composition[I] | Polyester, vinyl ester urethane, vinyl ester (a) | | | Component (b) | | | Product | | | Antimicrobial efficacy | | |
|---|---|---|---|---|---|---|---|---|---|---|---|---|
| | Average molecular weight per reactive double bond [g/mol] | Acid value [mg KOH/g UP] | Melt viscosity[II] [mPas] | Mass-average molecular weight (Mw) [g/mol] | Name | Mole content | [% by weight] | Water absorption after 7 days [%] | Glass transition temperature $T_G$ at 10 Hz [° C.] | Initial germ count (log CFU/ml) | Reference germ count after 24 h (log CFU/ml) | Surface germ count after 24 h (log CFU/ml) | Log reduction |
| HPMA$_1$MDI$_{1.01}$DPG$_{0.5}$ | | | | | TBAEMA | 4.63 | 65 | 2.21 | 97 | 5.3 | 8.1 | 1 | 7.1 |
| HPMA$_1$MDI$_{1.01}$DPG$_{0.5}$ | | | | | TBAEMA | 5.81 | 70 | 3.65 | 95.1 | 5.3 | 8.1 | 1 | 7.1 |
| (1-methyl ethylidene)bis [4,1-phenyleneoxy(2-hydroxy-3,1-propanediyl)]-bis methacrylate | 256.3 | | — | | TBAEMA | 2.08 | 60 | — | 94.5 | 5.3 | 8.1 | 3.7 | 4.4 |

I)
ITS stands for itaconic acid
NPG stands for neopentyl glycol
TCDDM stands for tricyclodecane dimethanol
TBAEMA stands for tert.-butylaminoethyl methacrylate
HPMA stands for hydroxypropyl methacrylate
TBBHEA stands for tert.-butyl-bis-hydroxyethylamin
HPN stands for hydroxypivalic acid neopentyl glycol ester
CHDM stands for 1,4 cyclohexane dimethanol
Dianol 220 stands for diethoxylated bisphenol A
MDI stands for methylene diisocyanate
DPG stands for dipropylene glycol II)
The apparatus has different shear rates, the shear rate is selected such that the measurement is carried out with maximum sensitivity. The shear rate at which the viscosity was measured is shown in brackets.

It can be stated that the problems of the invention can be solved with the products prepared, because:
1. In all the products prepared, a pronounced antimicrobial efficacy can be seen. This is an intrinsically antimicrobial effect.
2. The products all have a glass transition temperature which is suitable for use in a material.

The invention claimed is:

1. A curable composition, comprising
(a) a compound with a radically reactive double bond which is an unsaturated polyester, wherein the unsaturated polyester is obtained by reacting a dicarboxylic acid or a derivative of the dicarboxylic acid and a diol, the dicarboxylic acid being a compound of formula (I)

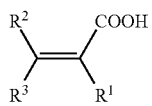

Formula (I)

where
$R^1$ is selected independently from H, $CH_3$ and $CH_2COOH$, and
$R^2$ and $R^3$ are selected independently from H, $CH_3$ and COOH,
and
(b) a methacrylate or acrylate selected from tert-butylaminoethyl methacrylate, dimethylaminoethyl methacrylate, diethylaminoethyl methacrylate, tert-butylaminoethyl acrylate, dimethylaminoethyl acrylate, diethylaminoethyl acrylate and mixtures thereof.

2. The curable composition as claimed in claim 1, wherein the dicarboxylic acid is fumaric acid, mesaconic acid, maleic acid, citraconic acid or itaconic acid or anhydrides thereof.

3. The curable composition as claimed in claim 1, wherein the dicarboxylic acid is itaconic acid or its anhydride.

4. The curable composition as claimed in claim 1, wherein the diol is selected from the group of 1,2-ethylene glycol, 1,2-propanediol, 1,3-propanediol, diethylene glycol, dipropylene glycol, triethylene glycol, tripropylene glycol, neopentyl glycol, butane-1,3-diol, butane-1,2-diol, butane-2,3-diol, butane-1,4-diol, 2-butyl-2-ethyl propanediol-1,3, 2-methyl propane-1,3diol, 2,2,4-trimethyl pentanediol-1,3, 2-ethyl-2-methyl propane-1,3-diol, 2,2-diethyl propanediol-1,3, 2-propyl-2-methyl propanediol-1,3, pentane-1,5-diol, hexane-1,6-diol, 2,4-dimethyl-2-ethyl hexane-1,3-diol, hydroxypivalic acid neopentyl glycol ester, isosorbide, tricyclodecane dimethanol, perhydrogenated bisphenol A, 2,2,4,4-tetramethyl cyclobutanediol-1,3, 1,4-cyclohexane dimethanol, ethoxylated and propoxylated bisphenol A or mixtures thereof.

5. The curable composition as claimed in claim 1 containing 20 to 100% by weight of the mixture of components (a) and (b) 0 to 80% by weight reactive diluent (c)
0 to 4% by weight initiator
0 to 60% by weight filler
0 to 60% by weight fibres
0 to 10% by weight additives (d),
based on the total weight of the curable composition.

6. A method of preparing a cured product comprising the steps of:
(a) reacting a dicarboxylic acid or a derivative of the dicarboxylic acid with a diol to form an unsaturated polyester compound having a radically reactive double bond, wherein the dicarboxylic acid is a compound of formula (I)

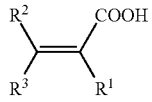

Formula (I)

where
$R^1$ is selected independently from H, $CH_3$ and $CH_2COOH$, and $R^2$ and $R^3$ are selected independently from H, $CH_3$ and COOH,
and
(b) mixing the unsaturated polyester compound with a methacrylate or acrylate selected from tert-butylaminoethyl methacrylate, dimethylaminoethyl methacrylate, diethylaminoethyl methacrylate, tert-butylaminoethyl acrylate, dimethylaminoethyl acrylate, diethylaminoethyl acrylate and mixtures thereof, to form a curable composition, and
(c) curing the curable composition to form the cured product.

7. The method as claimed in claim 6, wherein the curable composition further comprises a photoinitiator and is cured by irradiation.

8. The method as claimed in claim 6, wherein the cured product has antimicrobial properties.

9. The method as claimed in claim 6, wherein the cured product has a water absorption after seven days of 0.5 to 35%.

10. The method as claimed in claim 6, wherein the cured product has a glass transition temperature TG (measured at 10 Hz) of 50° C. to 150° C.

11. The method as claimed in claim 6, wherein the diol is selected from the group of 1,2-ethylene glycol, 1,2-propanediol, 1,3-propanediol, diethylene glycol, dipropylene glycol, triethylene glycol, tripropylene glycol, neopentyl glycol, butane-1,3-diol, butane-1,2-diol, butane-2,3-diol, butane-1,4-diol, 2-butyl-2-ethyl propanediol-1,3, 2-methyl propane-1,3diol, 2,2,4-trimethyl pentanediol-1,3, 2-ethyl-2-methyl propane-1,3-diol, 2,2-diethyl propanediol-1,3, 2-propyl-2-methyl propanediol-1,3, pentane-1,5-diol, hexane-1,6-diol, 2,4-dimethyl-2-ethyl hexane-1,3-diol, hydroxypivalic acid neopentyl glycol ester, isosorbide, tricyclodecane dimethanol, perhydrogenated bisphenol A, 2,2,4,4-tetramethyl cyclobutanediol-1,3, 1,4-cyclohexane dimethanol, ethoxylated and propoxylated bisphenol A or mixtures thereof.

12. The method as claimed in claim 6, wherein the curable composition comprises 20 to 100% by weight of the mixture of components (a) and (b), 0 to 80% by weight reactive diluent (c), 0 to 4% by weight initiator, 0 to 60% by weight filler, 0 to 60% by weight fibres, and 0 to 10% by weight additives (d), based on the total weight of the curable composition.

13. A method of preparing a product having a curable composition, said method comprising the steps of administering the curable composition to a product substrate, wherein the curable composition comprises:
(a) a compound with a radically reactive double bond which is an unsaturated polyester, wherein the unsaturated polyester is obtained by reacting a dicarboxylic acid or a derivative of the dicarboxylic acid and a diol, the dicarboxylic acid being a compound of formula (I)

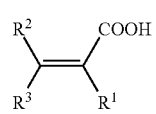

Formula (I)

where
$R^1$ is selected independently from H, $CH_3$ and $CH_2COOH$, and
$R^2$ and $R^3$ are selected independently from H, $CH_3$ and COOH,
and
(b) a methacrylate or acrylate selected from tert-butylaminoethyl methacrylate, dimethylaminoethyl methacrylate, diethylaminoethyl methacrylate, tert-butylaminoethyl acrylate, dimethylaminoethyl acrylate, diethylaminoethyl acrylate and mixtures thereof.

14. The method as claimed in claim 13, wherein the curable composition is administered to the product substrate by coating, painting, casting, dip coating, laminating, gap impregnation, centrifugation, bonding, resin injection, pressing, injection moulding, pultrusion, filling and levelling, or winding.

15. The method as claimed in claim 13, wherein the product is selected from the group consisting of: furniture and furniture surfaces, adhesives, veneers, paper laminates, buttons, handles, push buttons, switches and housings, plates, flooring, pipes, profiles, tanks, containers, foodstuffs, oils, linings, roof coatings, light panels, sealing compounds, putties, dowel compounds, polymer concrete, agglomerated marble, kitchen sinks, shower trays, bath tubs, wash basins, lavatory seats, garden furniture, garden fences, façade panels, cellar window shafts, vehicle parts, luminaires, wind power plants, impregnations, binders, grouting compounds, filling compounds, reaction mortar, coatings, varnishes, gelcoats, topcoats, ships, and boats.

\* \* \* \* \*